Figure 1:
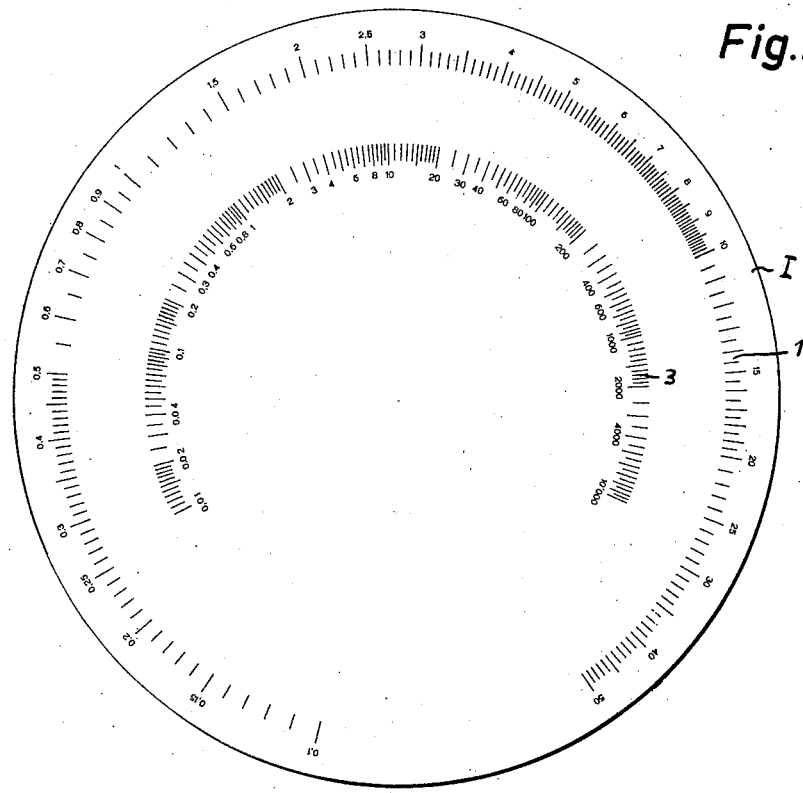
Figure 5:
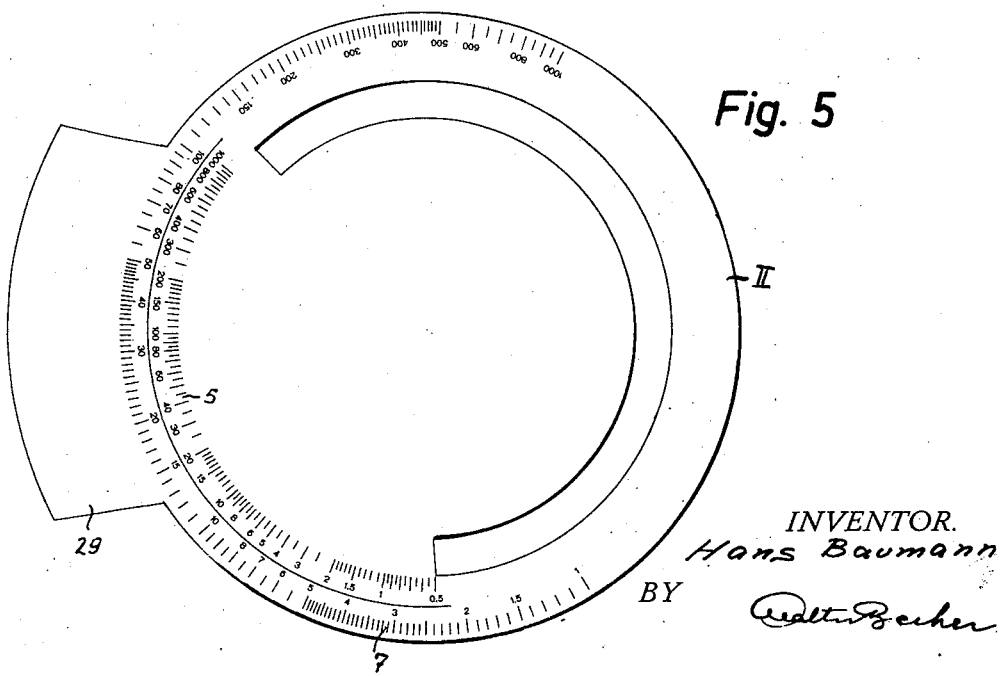

Jan. 9, 1962  H. BAUMANN  3,016,190
CALCULATING DISK FOR THE DETERMINATION OF THE MECHANICAL
VALUES INVOLVED IN A CYLINDRICAL SPRING
Filed April 7, 1958  3 Sheets-Sheet 1

INVENTOR.
Hans Baumann
BY

Jan. 9, 1962 H. BAUMANN 3,016,190
CALCULATING DISK FOR THE DETERMINATION OF THE MECHANICAL
VALUES INVOLVED IN A CYLINDRICAL SPRING
Filed April 7, 1958 3 Sheets-Sheet 2

INVENTOR.
Hans Baumann
BY

Jan. 9, 1962  H. BAUMANN  3,016,190
CALCULATING DISK FOR THE DETERMINATION OF THE MECHANICAL
VALUES INVOLVED IN A CYLINDRICAL SPRING
Filed April 7, 1958  3 Sheets-Sheet 3
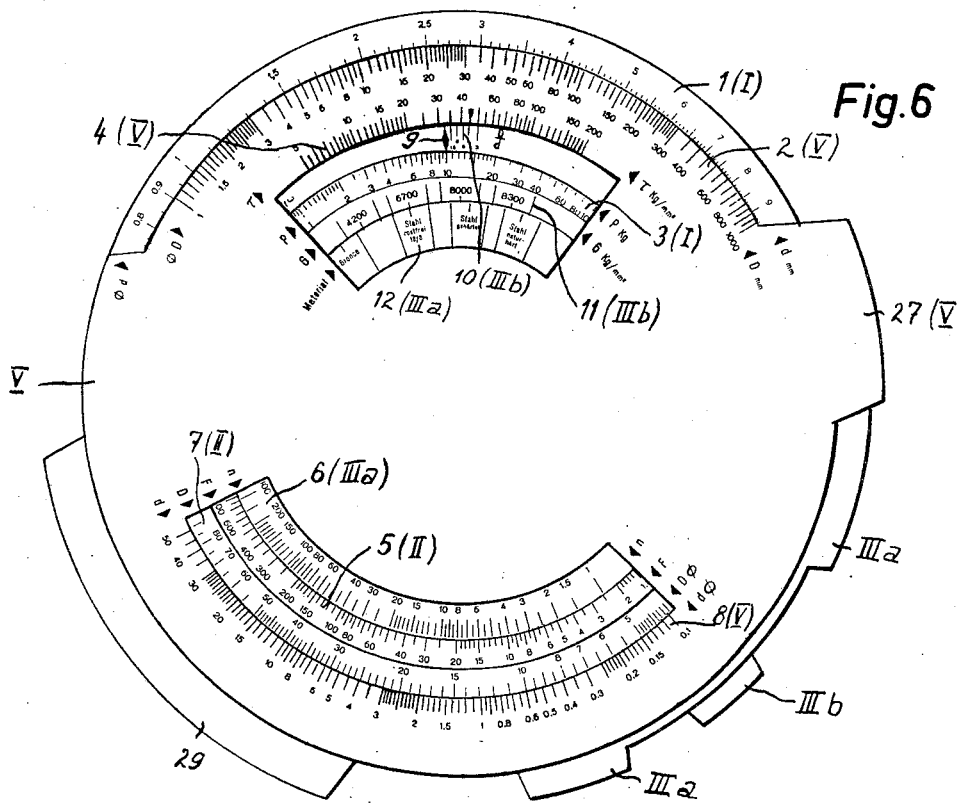
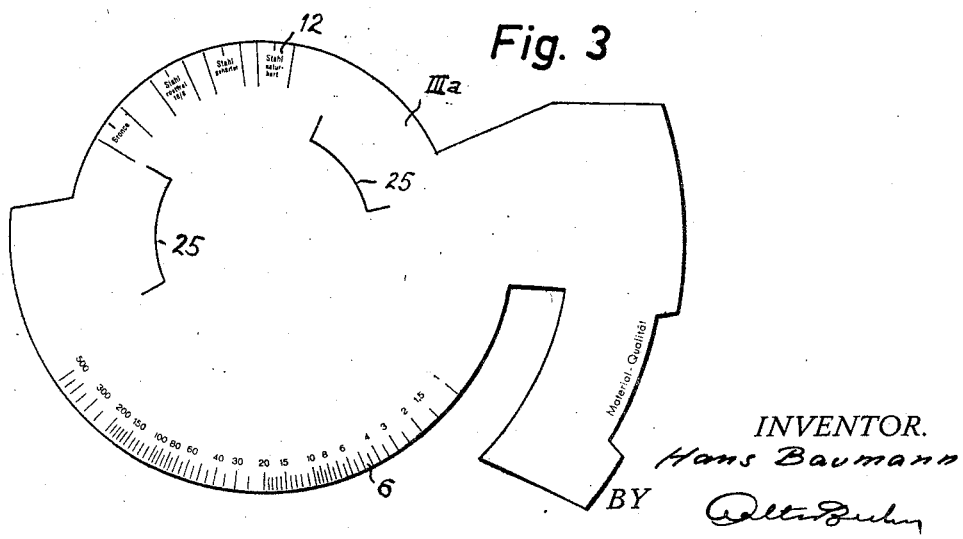
INVENTOR.
Hans Baumann
BY

United States Patent Office 3,016,190
Patented Jan. 9, 1962

3,016,190
CALCULATING DISK FOR THE DETERMINATION OF THE MECHANICAL VALUES INVOLVED IN A CYLINDRICAL SPRING
Hans Baumann, Richterswil, Switzerland, assignor to Karl Schroeder, Richterswil, Switzerland
Filed Apr. 7, 1958, Ser. No. 726,986
Claims priority, application Switzerland Sept. 14, 1957
1 Claim. (Cl. 235—84)

The present invention relates to a calculating disk for the determination of the values involved in a cylindrical spring.

In the determination of cylindrical compression and tension springs a number of geometric values and material properties must be adjusted to the desired capacity and the elongation and/or compression of a spring. The geometric values are the diameter of the spring wire employed and the mean diameter of the spring; the material stress and the modulus of transverse elasticity must be considered as material properties. The calculating disk according to the present invention now enables the values not given in a certain problem to be readily determined.

The calculating disk according to this invention is characterized by a base disk and at least three mobile disks concentrically and rotatably arranged on the base disk which is provided with a logarithmic scale which has adjacent thereto a further logarithmic scale on a mobile disk, two adjoining scales indicating the interrelation between the wire diameter and mean spring diameter at a certain relative angular position of the two disks relative to the said angular position, further characterized by a further logarithmic scale provided on the base disk for the spring tension and a scale for the material stress on the first mobile disk, associated values being determined for the two data, further characterized by two further mobile disks each provided with a scale of identical logarithmic magnitude on which the interrelation between the spring elongation and the number of turns is indicated, one of the last-named disks being provided with a further scale by means of which the angular position of these two mobile disks relative to the second-named disk can be set by means of a scale provided on the latter in dependence on the selected wire and spring diameter, and characterized by the fact that one of the last-named disks is provided with a mark indicating a point on both the scale for the material stress and on the scale for the spring tension.

An embodiment of the invention is represented in the drawings in which:

FIGS. 1–5 each show a disk of the combination of disks, and

FIG. 6 is a general view of the assembled calculating disk.

FIG. 1 shows the base disk of the calculating disk to which the mobile disks are rotatably attached by way of example by a rivet. The base disk I has its periphery provided with a scale 1 which may, by way of example, be calibrated in millimetres and from which the diameter of the spring wire employed can be read. The same disk I has a further scale 3 nearer its centre, which may be calibrated in kilograms and on which the spring load can be set and/or read. Both scales 1 and 3 are logarithmic.

Figure 2:
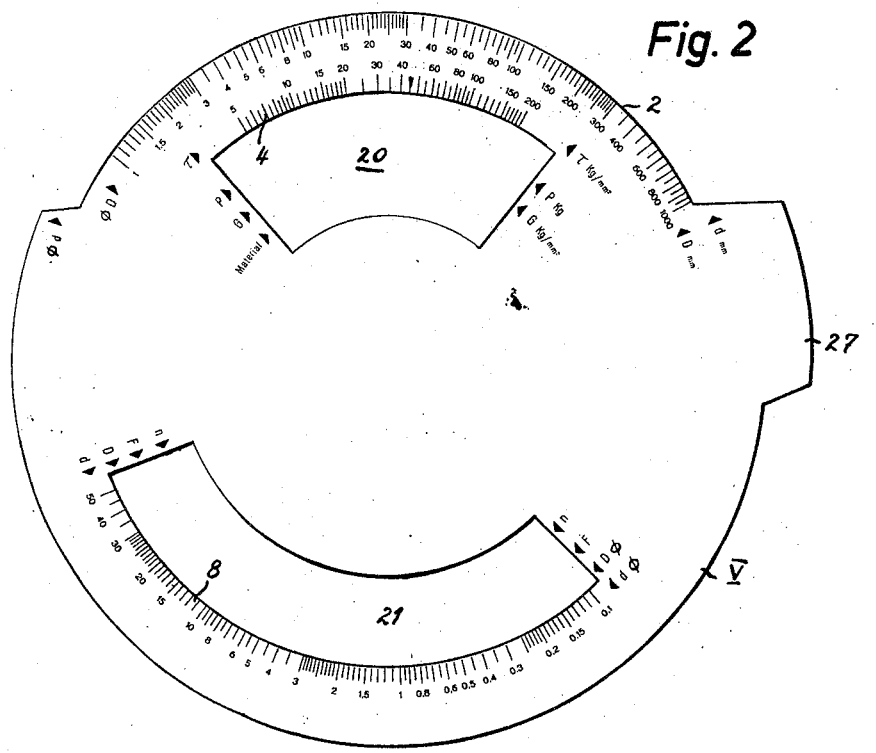

FIG. 2 shows the top mobile disk. It has its upper edge provided with a logarithmic scale 2 on which the mean spring diameter can be set or read. This scale 2 on the top mobile disk V is adjacent the scale 1 of the base disk I. At a certain relative angular position of the two disks I and V, the spring diameters corresponding to a certain wire diameter can be determined. The mobile disk V shown in FIG. 2 is provided with two windows 20 and 21 and a projection 27 to enable it to be more readily rotated. At the upper edge of the window 20 is a scale 4 for the material stress $\tau$. The scale 4 is logarithmic and may be calibrated in kilograms per square milimetre.

Figure 4:
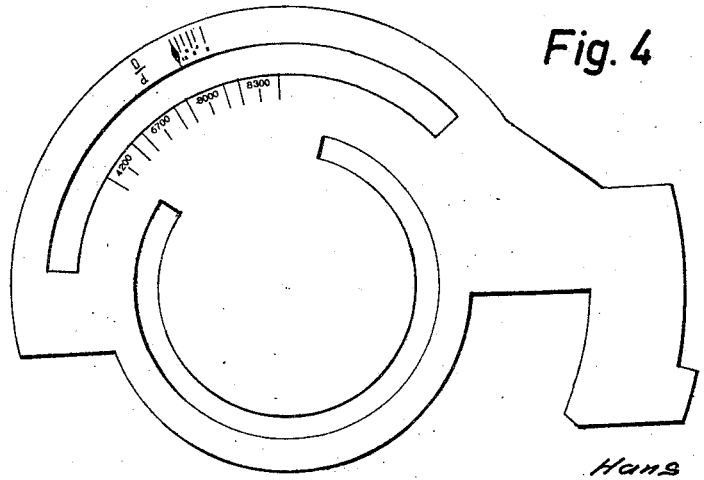

FIGS. 3 and 4 show the mobile disks IIIa and IIIb which are visible, together with the scale 3 of the base disk I, through the window 20 of the mobile disk V. The relative angular position of the disks IIIa and IIIb must be set in accordance with the modulus of transverse elasticity of the spring material. This setting is a secondary calculation required to be performed only once for each computation. It has therefore shown to be advantageous to couple the mobile disks IIIa and IIIb in such a manner that a greater force must be exerted to rotate them than to effect relative rotation of any other disk. This object is achieved by cuts 25 which engage one edge 22 of the mobile disk IIIb. This produces the desired greater frictional resistance between the two disks.

The disk IIIb is provided with a window 23 through which the scale 3 of the base disk I is visible. Provided at the top edge of the window 23 of the mobile disk IIIb is a double indicator 9 which indicates a value on the load scale 3 of the base disk I on the one hand, and a value on the stress scale 4 of the mobile disk V on the other.

It is thereby possible to establish the connection between the spring tension and the material stress. It is obvious that the material stress in a spring will increase if the ratio between the spring diameter and the wire diameter is relatively small, i.e. if the spring diameter is only a low multiple of the wire diameter. In order to enable this additional stress to be corrected in narrowly wound springs, a scale 10 having points for the ratio between spring diameter and wire diameter is arranged adjacent the double indicator 9 in such a manner that higher material stress values can be read from the scale 4 of the mobile disk V when the said ratio is low.

Provided at the inner edge of the window 23 of disk IIIb is a scale 11 for the modulus of elasticity which may be calibrated in kilograms per square millimetre. A corresponding scale 12 is provided on the mobile disk IIIa. Prior to computing, the modulus of elasticity known for a particular material must be made to register on the disks IIIa and IIIb and the scales 11 and 12 respectively.

The lower window 21 of disk V will now be considered. Through this window, a scale 6 of the disk IIIa is visible, which indicates the number of spring turns. In the illustration according to FIG. 6, a scale 5 is visible below scale 6, which is of the same logarithmic magnitude as scale 6 of the mobile disk IIIa. Scale 5 shows the elongation and compression respectively for a given number of turns on the adjacent scale 6, and vice-versa. The scale 5 is provided on a disk II which may be located immediately above the base disk I. As all other disks with the exception of base disk I, this disk II is provided with an adjusting lug 29. If the spring elongation or compression and the number of turns required for a certain elongation or compression is to be determined, the disk II must first be placed in an angular position relative to disk V which corresponds to the spring considered. To this end, the disk II is provided with a further scale 7 which has adjacent thereto a scale 8 provided at the lower edge of the window 21 of disk V. The scale 7 is calibrated to values of the spring diameter while the scale on the mobile disk V is calibrated to wire diameter values. Both scales have different logarithmic magnitudes.

In order to explain the operation of the calculating disk described above in greater detail, some example operations will be discussed below.

*Example I*

An existing pressure spring is to be recalculated. The given data are:

| | |
|---|---|
| Mean spring diameter | $D=20$ mm. |
| Wire diameter | $d=2.5$ mm. |
| Elongation/compression | $F=15$ mm. |
| Number of turns | $n=6$. |
| Material—stainless steel. | |

The values required are the load P and stress $\tau$.

The modulus of elasticity is first set by means of scales 11 and 12 on the mobile disks IIIa and IIIb, i.e. two divisions corresponding to a certain material are set to register. This setting remains unchanged until the calculation is completed. In the top section of disk V, the spring diameter $D=20$ mm. is set to the wire diameter $d=2.5$ mm. on disk I employing the scales 1 and 2. Without altering the setting obtained, the same setting between the scale 7 of disk II and scale 8 of disk V is effected in the lower window 21 of disk V. The scale 6 of disk IIIa is set in such a manner that the numeral 6 of scale 6 registers with an elongation/compression of 15 mm. on scale 5 of disk II.

The double indicator 9 on the mobile disk IIIb points at the value 10.2 kg. on the scale 3 of the base disk I in the window 20, and this value is the admissible load. The ratio between the spring diameter and the wire diameter being 8, a stress of $\tau=38$ kg./mm.$^2$ is indicated at 8 in scale 10 adjacent the double indicator. This setting is illustrated in the attached FIG. 6.

*Example II*

The given data of a spring are the following:

| | |
|---|---|
| Load | $P=15$ kg. |
| Stroke | $F=8$ mm. |
| Mean spring diameter | $D=10$ mm. |
| Stress | $\tau=60$ kg./mm.$^2$ |
| Material—naturally hard steel. | |

Data required: wire diameter and number of turns.

The modulus of elasticity is first set by means of disks IIIa and IIIb, i.e. the divisions of scales 11 and 12 corresponding naturally hard steel are brought to register. The double indicator 9 of the mobile disk IIIb is on the one hand set at a load of $P=15$ kg. on the scale 3 of base disk I and at a stress of 60 kg./mm.$^2$ on the scale 4 of mobile disk V on the other. According to a reading from the scales 1 and 2 of the disks I and V respectively, a spring diameter of $D=10$ mm. corresponds to a wire diameter of $d=1.85$ mm. This gives a ratio of turns of $10:1.85=5.5$. The actual stress is then found at 5 in scale 10 of the disk IIIb at the right of the double indicator on scale 4 of the disk V; the value is 77 kg./mm.$^2$. According to the assumption, the stress was only 60 kg./mm.$^2$. Without changing the positions of the disks (i.e. the double indicator remains at $P=15$ kg.) the stress value of 60 kg./mm.$^2$ (disk V) is placed at the numeral 5 of scale 10. The scales 1 and 2 will then show a wire diameter of $d=2$ mm. for a mean spring diameter of 10 mm.

The disc II is then set, by means of scale 7, relatively to disk V in such a manner that a diameter of 20 mm. for the spring corresponds to a wire diameter of 2 mm. The scales 6 and 5 then show that 9.2 effective turns of the spring are required for a spring elongation/compression of 8 mm.

Having now particularly described and ascertained the nature of my said invention and in what manner the same is to be performed, I declare that what I claim is:

A disk calculator comprising a plurality of concentric disks mounted for relative rotation comprising a base disk having a first scale adjacent its periphery and a second scale inward of its periphery, a second disk having a third scale on its periphery and a fourth scale inward of its periphery and an arcuate opening of more than 180°, a third disk having an arcuate opening of more than 180° and an arcuate opening opposite said first opening of less than 180°, and a fifth scale on the inner edge of said last-named opening and a sixth scale on the outer periphery and a radial mark extruding from the outer edge of said last-named opening to the outer periphery adjacent said sixth scale, a fourth disk having a seventh scale on its peripheral edge and an eighth scale on its opposite peripheral edge, and a fifth disk having a ninth scale on its peripheral edge and two arcuate openings, and a tenth scale on the outer edge of one opening and an eleventh scale on the outer edge of the other opening, the first scale adjoining the ninth scale to cooperate therewith, the mark and the second, fifth and seventh scales being visible through the opening adjacent the tenth scale, said mark cooperating with the tenth scale and the second scale, said tenth scale also cooperating with said sixth scale, said fifth and seventh scales also cooperating, and said third scale being visible through said other opening in said fifth disk and cooperating with said eleventh scale, and said fourth and eighth scales cooperating and being visible through said last named opening, said third and fourth disks having integral interengaging formations to retain said disks frictionally against movement relative to each other while allowing movement freely relative to other disks, whereby the cooperating fifth and seventh scales on said third and fourth disks may be set and actuated as if a single disk, but said two disks may slip against frictional resistance for adjustment.

References Cited in the file of this patent
UNITED STATES PATENTS

| | | |
|---|---|---|
| 753,840 | Barth et al. | Mar. 8, 1904 |
| 847,904 | Caswell | Mar. 19, 1907 |
| 1,881,165 | Becker | Oct. 4, 1932 |
| 2,373,671 | Feicht | Apr. 17, 1945 |
| 2,422,663 | Feild | June 24, 1947 |
| 2,533,489 | McFarlane | Dec. 12, 1950 |
| 2,533,580 | Hall | Dec. 12, 1950 |
| 2,584,406 | Willcox | Feb. 5, 1952 |
| 2,648,254 | Stimson et al. | Aug. 11, 1953 |
| 2,792,177 | Ker | May 14, 1957 |